US008692984B2

(12) United States Patent
Schell et al.

(10) Patent No.: US 8,692,984 B2
(45) Date of Patent: Apr. 8, 2014

(54) FIELD TESTER FOR TOPOLOGIES UTILIZING ARRAY CONNECTORS AND MULTI-WAVELENGTH FIELD TESTER FOR TOPOLOGIES UTILIZING ARRAY CONNECTORS

(75) Inventors: J. David Schell, Austin, TX (US); Seymour Goldstein, Austin, TX (US); Harlan Kassler, Austin, TX (US); Jackson Salling, Austin, TX (US)

(73) Assignee: Fluke Corporation, Everett, WA (US)

( * ) Notice: Subject to any disclaimer, the term of this patent is extended or adjusted under 35 U.S.C. 154(b) by 14 days.

(21) Appl. No.: 13/362,567

(22) Filed: Jan. 31, 2012

(65) Prior Publication Data

US 2013/0194566 A1   Aug. 1, 2013

(51) Int. Cl.
*G01N 21/00* (2006.01)
(52) U.S. Cl.
USPC ......................................................... 356/73.1

(58) Field of Classification Search
USPC ......................................................... 356/73.1
See application file for complete search history.

(56) References Cited

U.S. PATENT DOCUMENTS

| 5,196,899 | A | | 3/1993 | Serwatka |
| 5,767,957 | A | * | 6/1998 | Barringer et al. ............ 356/73.1 |
| 5,940,559 | A | | 8/1999 | Noll |
| 6,004,042 | A | | 12/1999 | Million et al. |
| 6,931,193 | B2 | | 8/2005 | Barnes et al. |
| 2007/0253662 | A1 | * | 11/2007 | Patel et al. ...................... 385/13 |
| 2011/0267602 | A1 | * | 11/2011 | Bills et al. .................... 356/73.1 |

* cited by examiner

*Primary Examiner* — Tu Nguyen
(74) *Attorney, Agent, or Firm* — Edwards Wildman Palmer LLP; Scott D. Wofsy; Christopher J. Capelli

(57) ABSTRACT

A test instrument comprises plural first optical signal sources at a first wavelength and a distributor coupled to the plural first optical signal sources to supply the signals produced to a multi-fiber test port. Additional second wavelength signal sources may be provided, and a second test instrument for use at a second end of the link under test may be provided, to effect testing of the optical link.

13 Claims, 8 Drawing Sheets

FIG. 3

FIELD TESTER FOR TOPOLOGIES UTILIZING ARRAY CONNECTORS AND MULTI-WAVELENGTH FIELD TESTER FOR TOPOLOGIES UTILIZING ARRAY CONNECTORS

BACKGROUND OF THE INVENTION

This invention relates to optical fiber testing, and more particularly to an optical fiber power, loss and polarity tester that incorporates a multi-fiber interface to enable efficient testing of cables and connections that have been terminated with multi-fiber connectors.

It is common practice to test loss and/or length of optical fiber after installation, repair, moves/adds/updates, etc. Today's most common topology consists of single-fiber connectors attached to single strands of fiber. These fibers are most often used in a duplex topology such that one fiber transmits network traffic in one direction and the other fiber transmits in the opposite direction. The individual fibers are often bundled into a large group within a cable but then individually terminated with a connector at each end of the fiber. FIG. 1 illustrates this common practice applied to a duplex fiber system wherein a main test unit 12 is connected to a fiber at a break-out and a remote test unit 14 is connected to the corresponding fiber at a remote end of the cable, and testing is performed by use of the two units.

Another common topology seen in today's high density data centers is to replace single fiber connectors with multi-fiber array connectors and cables as described in U.S. Pat. No. 6,004,042 and U.S. Pat. No. 6,931,193. It has been customary to terminate the multi-fiber array connectors into a break-out box (often called modules or cassettes). The break-out is accomplished through the use of a short set of fibers that are terminated to a multi-fiber array connector on one end and then to individual single fiber connectors at the opposite end. The boxes enable connection of the multi-fiber array cable plant to the duplex electronic equipment or cross-connects utilizing standard patch cords with single fiber connectors.

A new topology that is becoming more prevalent and has been standardized by IEEE in their 802.3ba-2010 standard for both 40 Gigabit Ethernet (40 GbE) and 100 Gigabit Ethernet (100 GbE) utilizes transceivers with multi-fiber array interfaces in the electronic equipment (instead of duplex interfaces) enabling patch cords with multi-fiber array connectors to be connected directly from the transceiver to the cable's multi-fiber termination. Therefore the need for the break-out boxes is eliminated. However, the elimination of the break-out box also eliminates the single fiber connector interface that is required for testing the cable plant. Prior art has continued to utilize the traditional test equipment with the single fiber interface by creating a break-out cable that is similar to the break-out box previously described, illustrated in FIG. 2. Some prior art is found in U.S. Pat. No. 5,940,559 and U.S. Pat. No. 5,196,899. This prior art makes testing of the cabling very slow and error prone. Additionally, a measurement of the polarity of the multi-fiber cable plant is highly desirable but prior art cannot do this automatically.

It is not obvious to those skilled in the art of optical fiber testing how to create an optical power, loss, and polarity tester for multi-fiber connectors. It is even less obvious how to do the same with the additional requirement of testing at multiple wavelengths. Testing at multiple wavelengths is common with duplex fiber testers, the main purpose of testing at multiple wavelengths being to ensure the cabling plant meets the loss budget at the wavelengths that will be running on the active network. It is also the purpose of testing at multiple wavelengths to utilize a long wavelength so to ensure no bending loss is present in the cabling plant. Optical fiber is typically more sensitive to bend losses at longer wavelengths.

It would be desirable to have a tester capable of easily testing multi-fiber connectors at single and multiple wavelengths.

SUMMARY OF THE INVENTION

In accordance with the invention, field testers are provided with array connector interfaces to connect to an optical network under test.

Accordingly, it is an object of the present disclosure to provide an improved field tester for optical networks.

It is a further object of the present disclosure to provide an improved tester for use with array connectors.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The system according to a preferred embodiment of the present invention comprises field testers for optical networks employing array connectors. The testers may be provided as portable or hand held instruments for testing of optical networks in the field.

Figure 4:
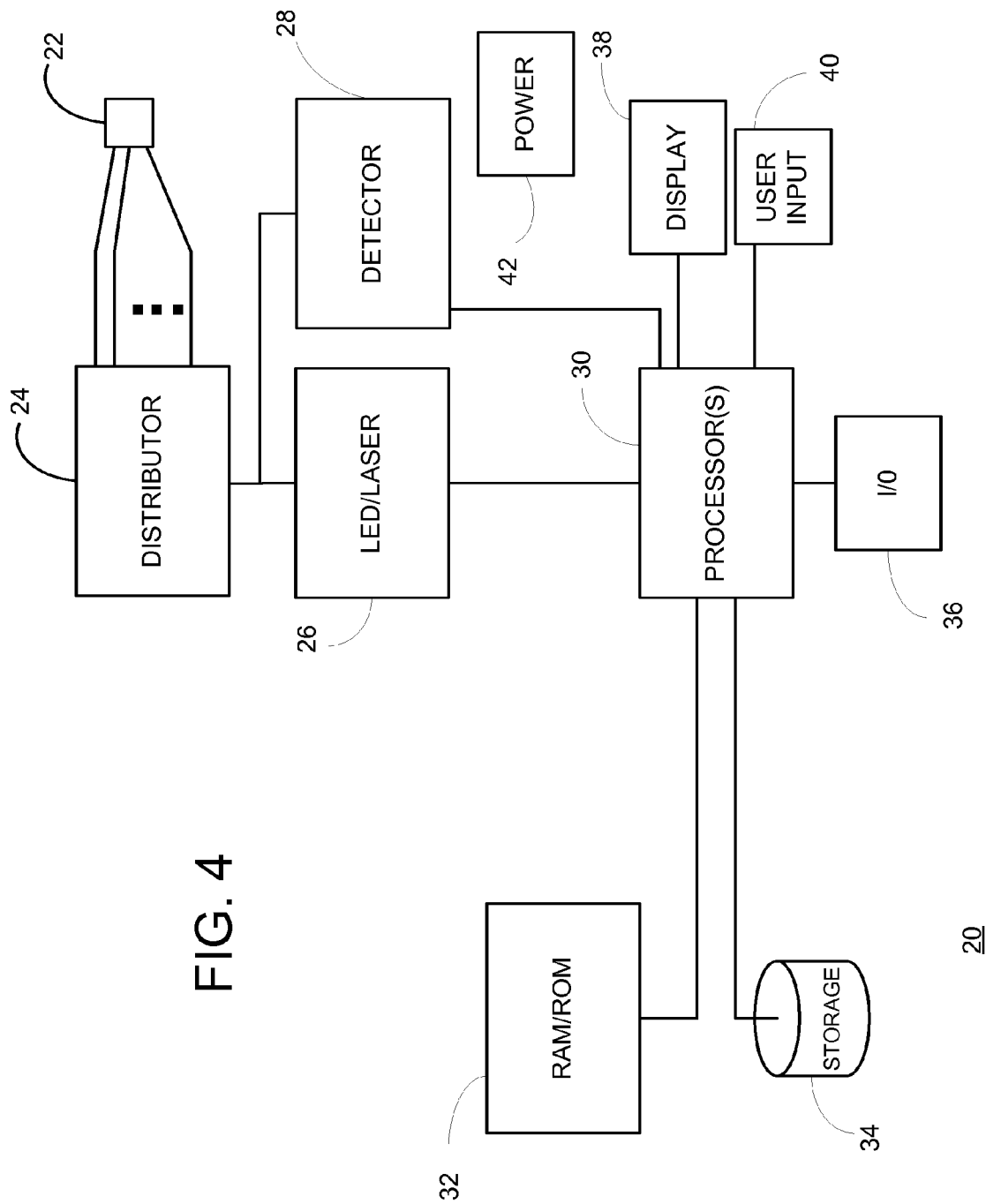
FIG. 4 is a block diagram of an embodiment of a test instrument.

Referring to FIG. 4, a block diagram of a first embodiment of a test instrument in accordance with the disclosure, instrument 20, the instrument connects to a network under test, an optical network in a particular embodiment, via multi-fiber test port 22, which is interfaced to the test instrument by a distributor 24. The distributor interfaces with LED/laser 26 and detector 28, for receiving optical signals from the laser and transmitting to the test port, and for supplying received optical signals from the test port to the detector. The instrument includes processor(s) 30, memory such as RAM/ROM 32, persistent storage 34, I/O 36 which attaches the device to a network or other external devices (storage, other computer, etc.), display 38, user input devices 40 (such as, for example, keyboard, mouse or other pointing devices, touch screen, etc.), power supply 42 which may include battery or AC power supplies. The processor(s) operate the instrument to provide test and measurement function for the network.

In operation, the network test instrument is attached to the network, and observes transmissions on the network and provides stimulus and response measurement to collect information and statistics and effect testing and measurement.

Figure 1:
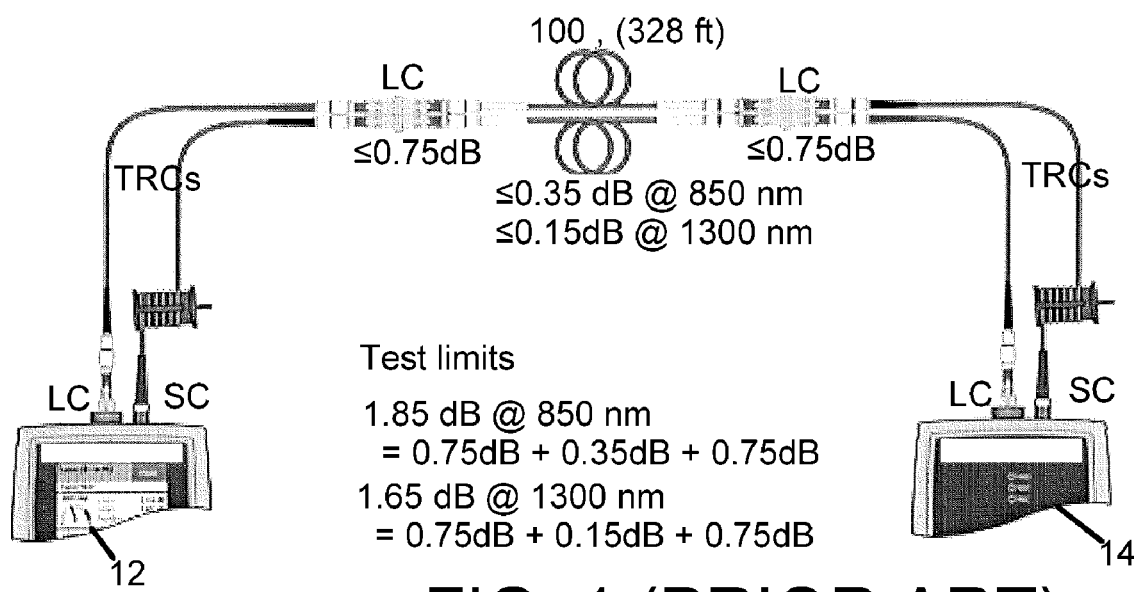
FIG. 1 is a diagram of a test set up in accordance with the prior art.
Figure 2:
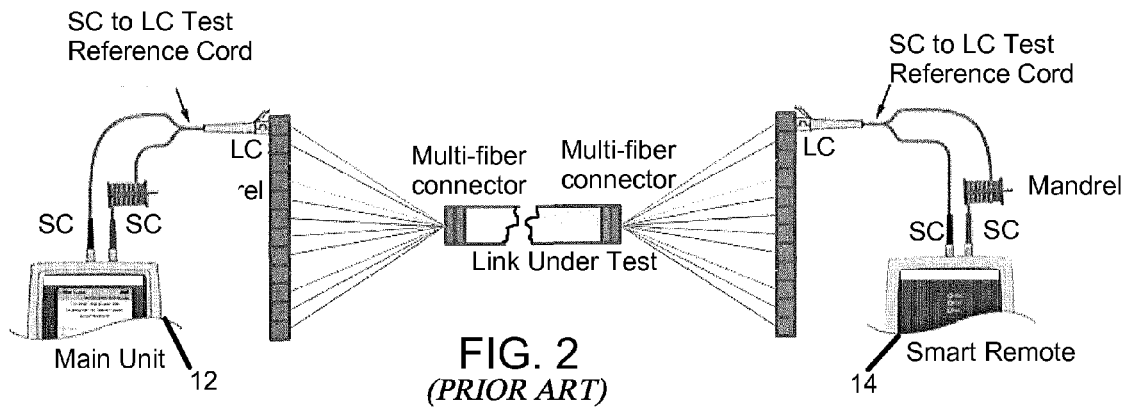
FIG. 2 is a diagram of a test configuration employing a break-out cable in accordance with the prior art.
Figure 3:
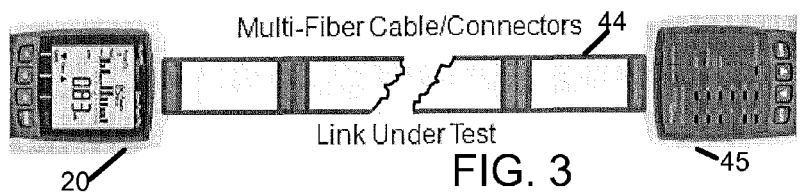
FIG. 3 is a diagram of a test instrument set up in accordance with the disclosure.

This device and method herein eliminate the need for break-out cables and boxes by providing multi-fiber interfaces at the test port. This enables the use of multi-fiber test cords to connect the tester 20 to the cable plant under test 44 (see FIG. 3). With reference to FIG. 3, in a particular embodiment, two testers are provided, with instrument 20 on one end of the link under test, and instrument 45 at the other end of the link under test, both of which may comprise portable or hand held test instruments. Instruments 20 and 45 cooperate to effect testing, and may comprise both active test instruments or an active and more passive test instrument, with the active instrument controlling the testing, and the more passive instrument providing measurement results back to the active instrument.

The instrument combines power/loss measurement function with the ability to measure polarity.

This apparatus and methods according to the disclosure enable a new testing paradigm by integrating a multi-fiber test interface directly onto the tester itself. While the concept of integrating the interface onto a tester may be apparent, the manner of accomplishing the integration while maintaining the capability to measure power, loss and polarity is not obvious. The test set consists of a source meter 20 and a power meter 45. The source meter transmits the optical signal that is to be measured and the required encoding necessary to determine polarity. The power meter measures the optical power of the source's optical signal and decodes it to determine polarity.

There are several ways of creating a source meter that integrates a multi-fiber test interface.

Figure 5:
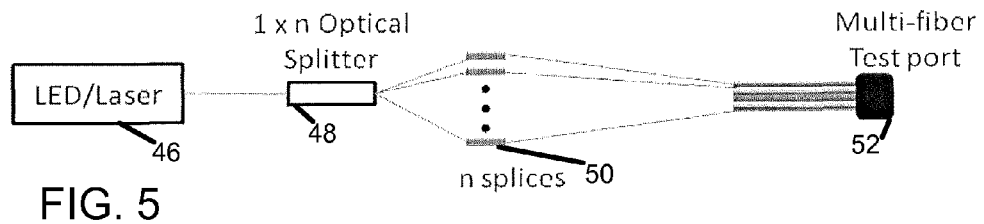
FIG. 5 is a diagram of an example configuration of a test instrument.

The first method utilizes a single LED 46 or laser and splits it into many optical signals with a 1×n optical splitter 48 performing the function of distributor 24 of FIG. 4, as seen in FIG. 5, a diagram of an example configuration. The n split signals are then provided to the multi-fiber test port 52 via n splices 50. Advantages to employing the configuration of FIG. 5 are low cost and high durability and high accuracy. The disadvantage is that all fibers have the same optical signal imposed upon them. Without being able to differentiate one from another the power meter is not able to ascertain polarity. For this reason this method is not considered to be the most desirable solution.

Figure 6:
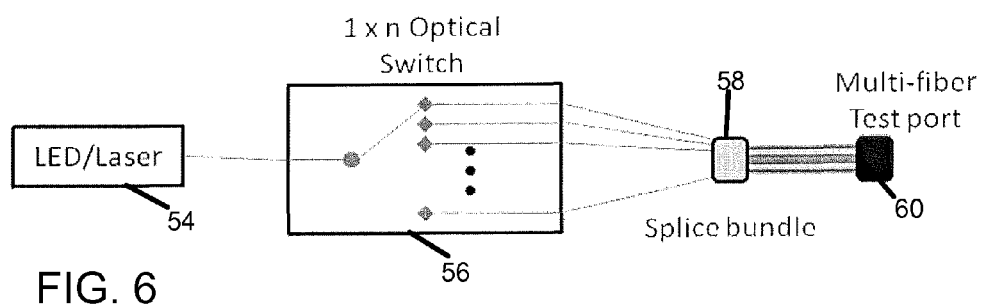
FIG. 6 is a diagram of another example configuration of a test instrument.

Referring to FIG. 6, an alternate method utilizes a single laser or LED 54 within the source meter and multiplexes it with a 1×n optical switch 56 as the distributor, which interfaces with the multi-fiber test port 60 via splice bundle 58. An advantage of this method is the ability to isolate and control the optical signal onto any of the fibers under test. If the source is encoded with information describing the switch's position and paired with a power meter that can decode the information then the polarity of the multi-fiber cable may also be measured. A disadvantage of this method is that the switch tends to be high cost, especially for multimode switches. Another disadvantage is the repeatability of the switch may not be sufficient to make accurate loss measurements. Another disadvantage is that the switch may not be very robust.

The implementation of FIG. 6 improves upon the FIG. 5 configuration by adding the ability to filter out all optical signals except for the one that is carried on the fiber of interest (allowing polarity measurement). This filter may comprise, for example, a moveable aperture. The aperture is moved (linearly, rotationally or other) to allow the signal from each fiber to be measured. A mechanical knob, or slide may be used in a manual method or the aperture may be controlled through electromechanical devices such as worm screws. The advantage is that the polarity may now be determined. The disadvantage is that this solution may not be as cost effective. It may not be robust. The manual version is not efficient and the electromechanical version will not be as efficient as a method with no moving parts.

Figure 7:
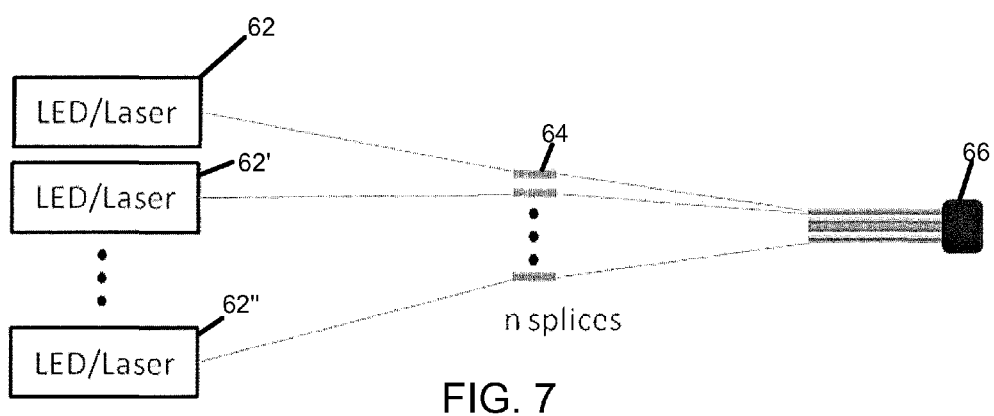
FIG. 7 is a diagram of yet another example configuration of a test instrument.

Accordingly another embodiment is shown in FIG. 7, utilizing n LED or laser sources 62, 62', etc. supplied via n splices 64 to the connector 66 instead of a multiplexing method. One skilled in the art might consider this method to be likely the least desirable due to cost and long term reliability of adding n sources into the source meter. However, with modern processes the cost of these sources has been driven down and the reliability up so that this method becomes preferred. It has the advantages of individual control of each fiber under test, highly accurate and repeatable, low cost and high reliability. The detector can either be supplied by a distributor or plural detectors can be employed.

Figure 8:
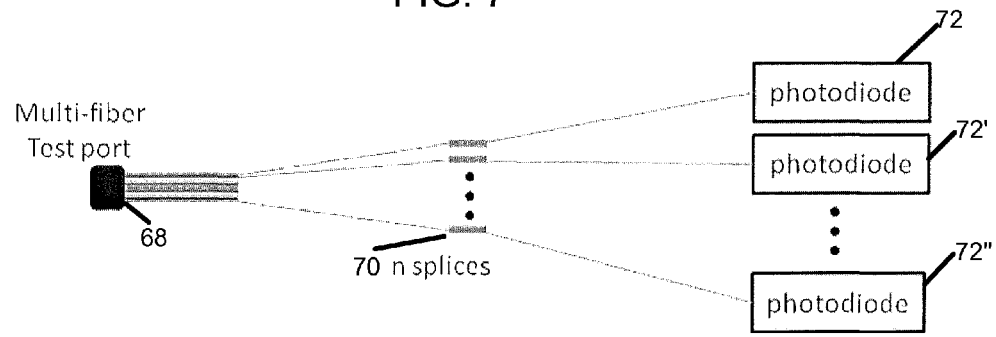
FIG. 8 is a diagram of a corresponding other end test instrument corresponding to the configuration of FIG. 7.

The configuration of FIG. 8 of the detector replaces the large area detector at remote instrument 45 with n individual small area detectors that are "pigtailed" to the multi-fiber interface with n individual fibers, wherein the multi-fiber test port connector 68 is fed through n splices 70 to plural photodiodes 72, 72', etc. This method allows simultaneous measurement of all fibers so that if polarity is incorrect such that the expected signal is found on the wrong detector the error may immediately be found. The cost of such an arrangement is most likely comparable to the configuration of FIG. 6 given the complexity of the mechanical parts. A disadvantage is that the fiber interface at the test port is not ideal for power loss measurements due to the loss that can occur at such an interface. The use of a non-contact lensing system or large core fibers is one way to alleviate the issue.

An alternative configuration replaces the individual "pigtailed" detectors with a photodiode array of n photodiodes. Reduced cost may be realized with this method. Additionally, the photodiode array may be directly coupled to the multi-fiber interface through the use of noncontact bulk optics or planar lightwave circuits which eliminates the need for the fiber between the multi-fiber interface and the photodiodes. This ultimately improves durability, accuracy and repeatability.

Figure 9:
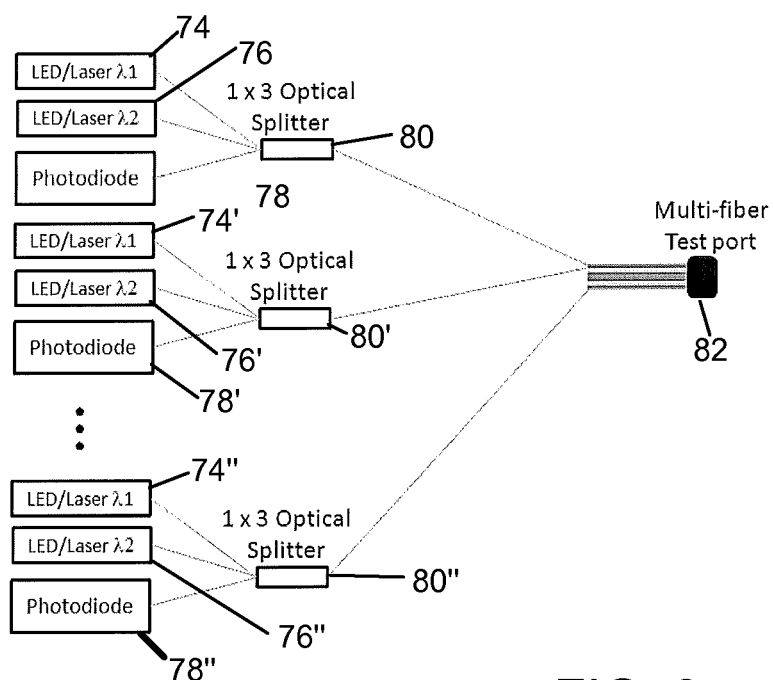
FIG. 9 is a diagram of a dual wavelength test instrument.

The above described configurations show single wavelength LED/Laser sources. However, multiple wavelength versions are also provided. Referring to the multiple wavelength version, illustrated in FIGS. 9-12, multiple wavelength method 1, depicted in FIG. 9, is a first of four configurations described hereinbelow. In this configuration, main and remote test instruments would have identical optical harnesses, each harness having an LED or laser 74 of wavelength 1, another LED or laser 76 of wavelength 2, and a photodiode 78 capable of detecting and measuring wavelengths 1 and 2. These three components are duplicated n times to match the number of fibers (n) in the multi fiber connector. The three components are coupled to the input/output port 82 through an optical coupler 80 that would be duplicated n times. The coupler is by nature a bidirectional device and therefore the LED/laser will transmit through it to test the fiber to which it is connected and the detectors will receive through it to test the fiber to which it is connected. This configuration enables full bidirectional testing on each fiber by having the main transmit to the remote which does not transmit until it receives the main's signal to do so. Polarity testing is easily accomplished since each transmitter may be encoded to signal which fiber it is attached to and each detector may determine if that signal is received upon the correct fiber. Length testing is accomplished by measuring the time for a signal to be transmitted from the main to the remote and back to the main. A potential drawback for method 1 to be marketable is the high cost that results from the large number of optical components.

Figure 10:
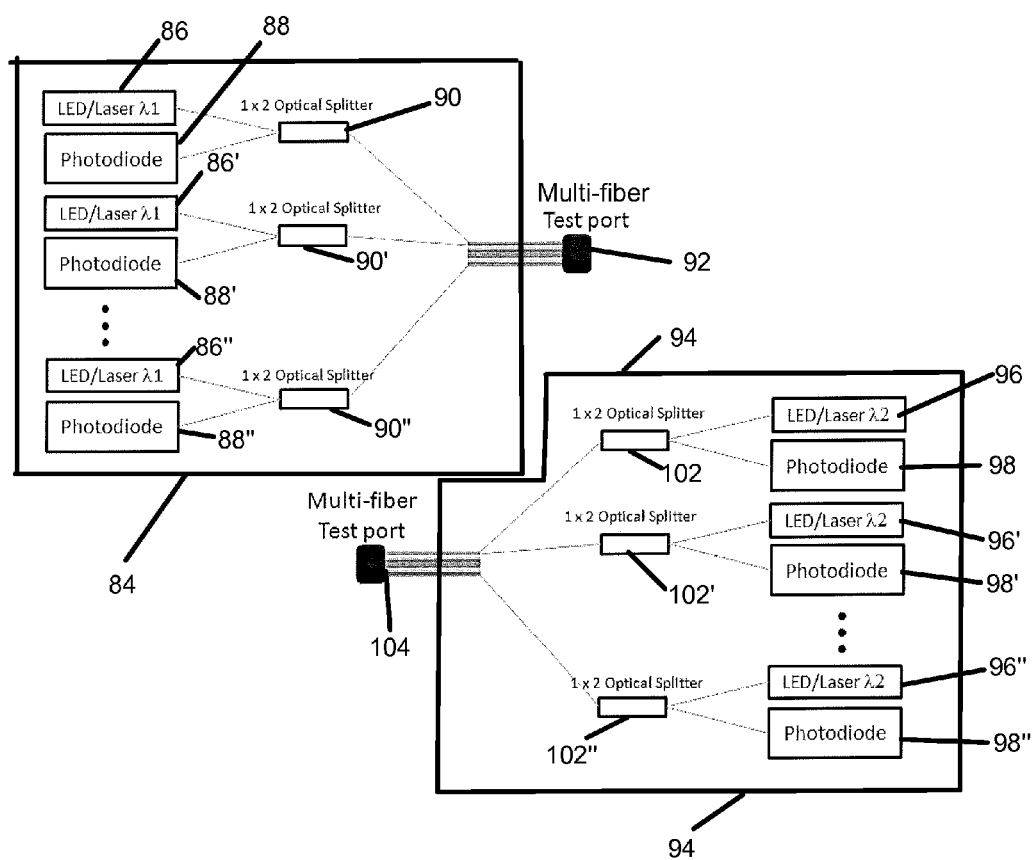
FIG. 10 is a diagram of an alternative dual wavelength test instrument.

Multi-wavelength method 2, illustrated in FIG. 10, eliminates half the LED/lasers that are required for method 1. Instead of testing each fiber with 2 wavelengths in both directions, method 2 tests each fiber with 1 wavelength in one direction and then the other direction is tested with the other wavelength. The main test instrument 84 at one end of the link under test contains plural LED/Lasers 86, 86', etc. of wavelength λ1 with corresponding photodiodes 88, 88', etc., connected by 1×2 optical splitters 90, 90', etc., which connect to individual fibers in the multi-fiber test port 92. At the opposite end of the link under test, remote test instrument 94 at the opposite end of the link under test contains comprises plural LED/lasers 96, all of wavelength λ2, and photodiodes 98, connected via 1×2 optical splitters 102 to multi-fiber test port 104. The testing is still bidirectional on each fiber.

Figure 11:
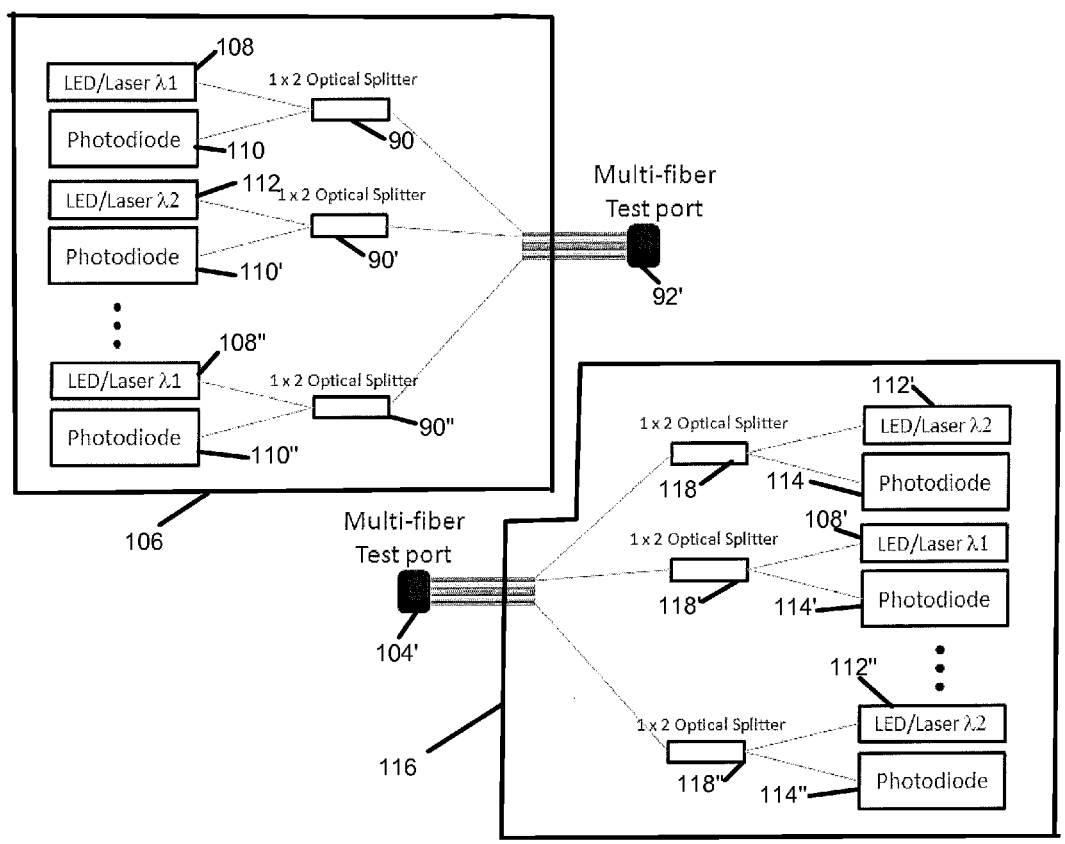
FIG. 11 is a diagram of a further alternative dual wavelength test instrument.

An alternative method, method 3 illustrated in FIG. 11, is very similar to method 2 with the exception that it alternates wavelengths on alternate fibers so that the main and remote tester each contain both wavelengths λ1 and λ2, wherein instrument 106 has alternating LED/Lasers 108 of wavelength λ1 with LED/Lasers 112 of wavelength λ2. Photodiode 110 is on the first fiber with the LED/Laser 108. Thus the various fibers have alternating signals λ1, λ2, λ1, λ2, .... Instrument 116 correspondingly has LED/Lasers 112' of wavelength 2 and photodiodes 114 supplied to 1×2 optical splitters 118 followed by LED/Laser 108' and photodiode 114' supplied to optical splitter 118', continuing with wavelength λ2 and λ1 alternating λ2, λ1, λ2, λ1 ....

Figure 12:
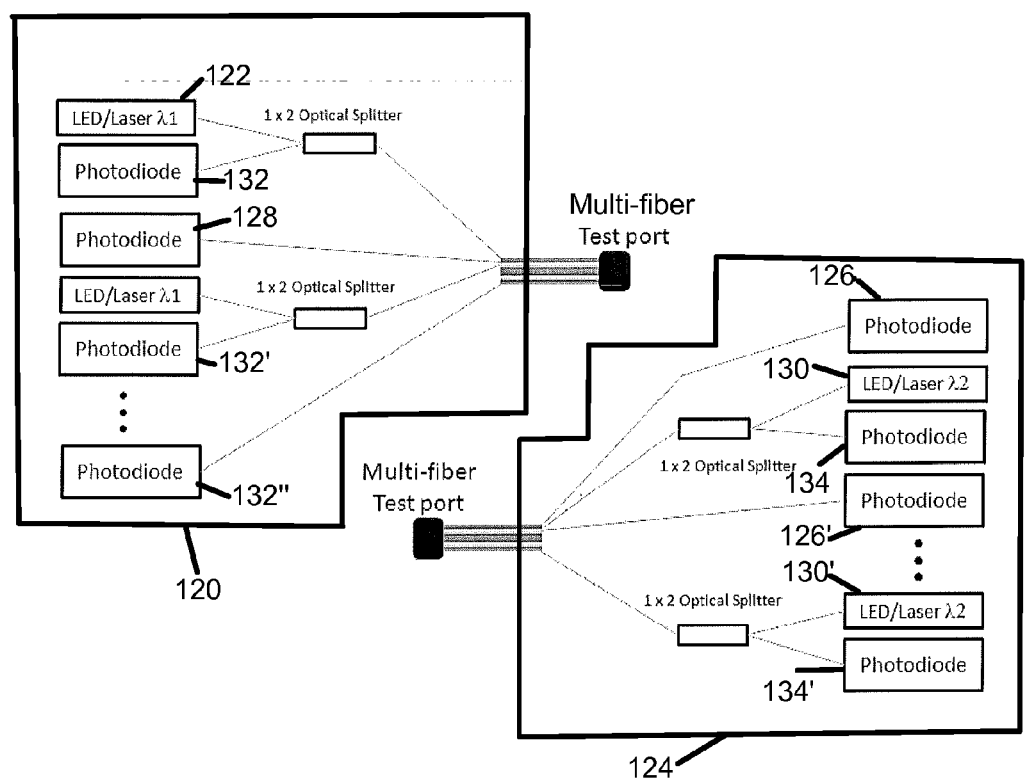
FIG. 12 is a diagram of a yet another alternative dual wavelength test instrument.

Method 4, shown in FIG. 12, eliminates 75% of the LED/lasers that are required relative to method 1 by employing LED/Lasers of wavelength 1 on alternate fibers in the main tester, and LED/Lasers of wavelength 2 in the remote tester, on those fibers not having wavelength 1 LED/Lasers in the main unit. A trade-off to accomplish this costs savings is that bidirectional testing of each fiber is not possible. The main 120 will have a LED/laser 122 of wavelength 1 at fiber 1 and the remote 124 will have a photodiode 126 at fiber 1. The reverse is true at fiber 2 where the main will have a photodiode 128 and the remote will have a LED/laser 130 of wavelength λ2. Length testing will be accomplished by sending the signal from the main to remote on fiber 1 and then from the remote to main on fiber 2. In order to accomplish polarity testing each LED/laser will have to be paired with a photodiode 132, 134. This photodiode will be able to detect if the signal from fiber n arrives at the correct location. Every fiber could not be monitored for polarity without these extra photodiodes. The elimination of bidirectional testing is not detrimental for this application. It has been noted that fibers and fiber connectors do not exhibit much directional difference when loss testing utilizing direct measurements of continuous wave light sources.

While single wavelength single direction and multi-wavelength multi-direction embodiments are shown, it is possible to have a single wavelength multi direction (or multi wavelength single direction) embodiment in accordance with the spirit of the disclosure herein.

Accordingly, improved field testers for optical networks employing topologies utilizing array connectors are provided. The testers integrate power/loss measurements with polarity testing.

While preferred embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. An optical network test instrument, comprising:
   a first unit comprising a plurality of first optical signal sources at a first wavelength and a first distributor coupled to the plurality of first optical signal sources to supply the signals produced to a first multi-fiber test port; and
   a second unit comprising a plurality of photodiodes coupled to a second distributor to receive signals from a second multi-fiber test port, wherein the first unit and the second unit connect to opposite ends of a fiber link under test and wherein the first and second units selectively measure optical power, optical loss and polarity of the received signals.

2. The optical network test instrument according to claim 1, wherein the first unit further comprises a plurality of second optical signal sources at a second wavelength, said first distributor coupled to the plurality of second optical signal sources to supply the signals produced to the first multi-fiber test port.

3. The optical network test instrument according to claim 2, wherein said plurality of first optical signal sources and said plurality of second optical signal sources are coupled to the first distributor to supply the signals produced in an alternating manner to alternating fibers in the first multi-fiber test port.

4. The optical network test instrument according to claim 3, wherein the plurality of photodiodes of the second unit are configured to detect and measure the first and the second wavelengths.

5. The optical network test instrument according to claim 4, wherein said first distributor comprises a plurality of 1×2 optical splitters that connect one of said plurality of first optical signal sources and said plurality of second optical signal sources to the first multi-fiber test port.

6. The optical network test instrument according to claim 1, wherein said first unit and said second unit communicate with each other.

7. An optical network test instrument set, comprising:
   a first test instrument comprising a plurality of first optical signal sources at a first wavelength, the first test instrument coupled to a first end of a fiber link under test;
   a first distributor coupled to the plurality of first optical signal sources to supply the signals produced to a first multi-fiber test port at the first end of the link under test;
   a second test instrument comprising a plurality of second optical signal sources at a second wavelength, the second test instrument coupled to a second end of the fiber link under test; and a second distributor coupled to the plurality of second optical signal sources to supply the signals produced to a second multi-fiber test port at the second end of the link under test; and a plurality of first photodiodes coupled to the first distributor to receive signals from the first multi-fiber test port at the first test instrument and a plurality of second photodiodes coupled to the second distributor to receive signals from the second multi-fiber test port at the second test instrument, wherein the first and second test instruments selectively measure optical power, optical loss and polarity of the received signals.

8. The optical network test instrument according to claim 7, wherein said first and second wavelengths comprise the same wavelength.

9. The optical network test instrument according to claim 7, wherein said first and second wavelengths comprise different wavelengths.

10. The optical network test instrument according to claim 7, further comprising a plurality of third optical signal sources at the second wavelength in the first test instrument, said first distributor coupled to the plurality of third optical signal sources to supply the signals produced to the first multi-fiber test port.

11. The optical network test instrument according to claim 10, wherein said plurality of first optical signal sources and said plurality of third optical signal sources are coupled to the first distributor to supply the signals in an alternating manner to the first multi-fiber test port.

12. The optical network test instrument according to claim 11, wherein said first distributor comprises a plurality of 1×2 optical splitters that connect the plurality of first photodiodes and a one of said plurality of first optical signal sources and said plurality of third optical signal sources to the first multi-fiber test port.

13. The optical network test instrument according to claim 7, wherein said first test instrument and said second test instrument communicate with each other.

\* \* \* \* \*